United States Patent [19]

Holldorff

[11] Patent Number: 4,622,830

[45] Date of Patent: Nov. 18, 1986

[54] ABSORPTION REFRIGERATION SYSTEM WITH SEPARATE HIGH- AND LOW-PRESSURE SECTIONS AND METHOD OF OPERATING SUCH A SYSTEM

[75] Inventor: Günther Holldorff, Berlin, Fed. Rep. of Germany

[73] Assignee: Borsig GmbH, Berlin, Fed. Rep. of Germany

[21] Appl. No.: 754,921

[22] Filed: Jul. 15, 1985

[30] Foreign Application Priority Data

Sep. 7, 1984 [DE] Fed. Rep. of Germany ....... 3432888

[51] Int. Cl.⁴ .............................................. F25B 27/00
[52] U.S. Cl. ................................... 62/238.3; 62/476; 62/486; 62/495
[58] Field of Search ................ 62/101, 486, 495, 476, 62/238.3

[56] References Cited

U.S. PATENT DOCUMENTS 4,380,909 4/1983 Sung ............................. 62/238.3 X
4,410,134 10/1983 Heimback ........................ 62/486 X
4,464,907 8/1984 Mack et al. ....................... 62/495 X Primary Examiner—Lloyd L. King
Attorney, Agent, or Firm—Max Fogiel

[57] ABSTRACT

A method of operating an absorption refrigeration system. The system has high- and low-pressure sections. The sections are connected by three lines and have an evaporator for subcooling the liquified refrigerant before it enters a connecting line. To enable uninterrupted transport of the weak refrigerant solution without increasing prime cost, the refrigerant vapor is fed from a subcooler into the expanded weak refrigerant solution at one or more points and a connecting line that conveys the weak refrigerant acts as an absorber. Expanded and evaporating refrigerant fluid flows through a subcooler in the high-pressure section. A condenser is in a line that conveys the weak refrigerant solution. The exit from the subcooler communicates through another line downstream of an expansion valve with a line that conveys the weak refrigerant solution and acts accordingly as an uncooled absorber.

6 Claims, 1 Drawing Figure

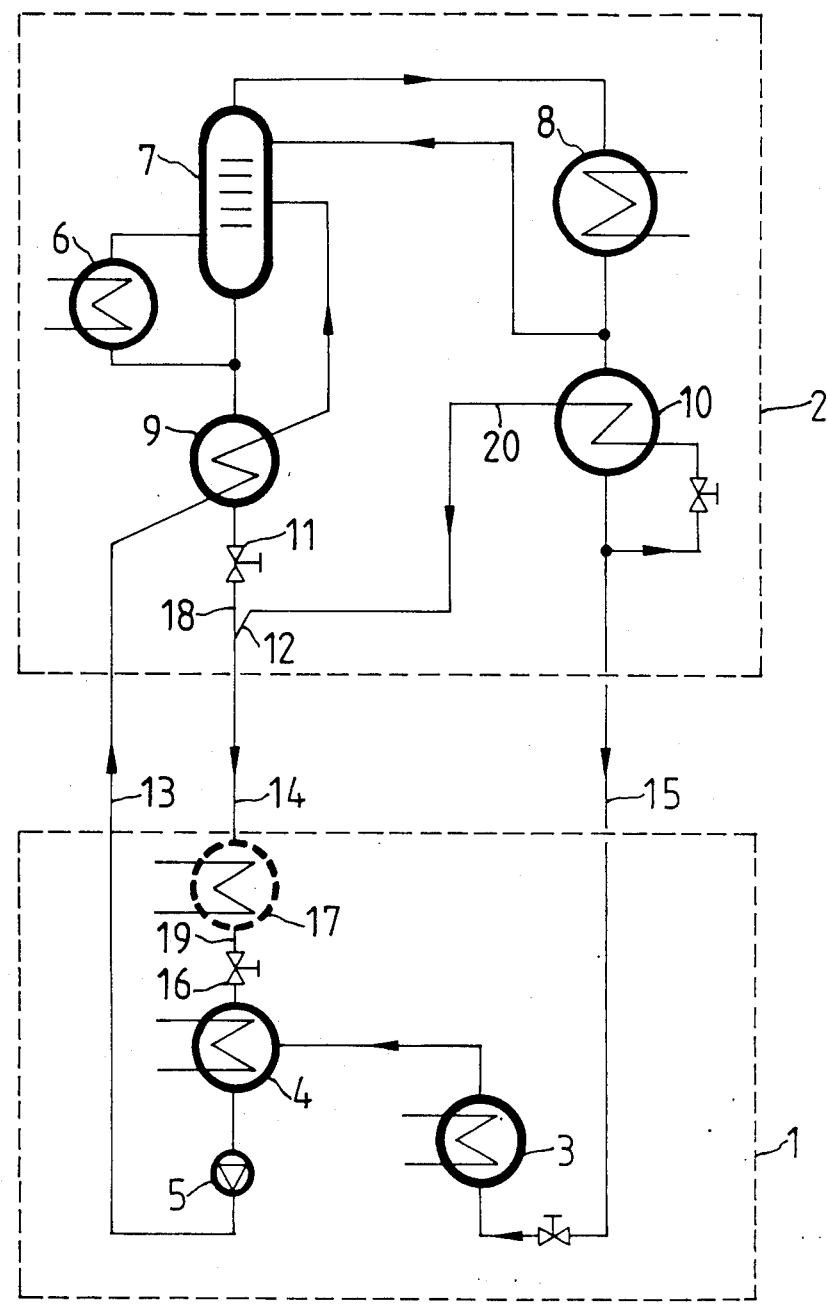

ABSORPTION REFRIGERATION SYSTEM WITH SEPARATE HIGH- AND LOW-PRESSURE SECTIONS AND METHOD OF OPERATING SUCH A SYSTEM

BACKGROUND OF THE INVENTION

The present invention relates to an absorption refrigeration system with separate high- and low-pressure sections, the high-pressure section containing a desorber, a rectifying column, a solution heat exchanger, a condenser, and a subcooler and the low-pressure section, which is connected to the high-pressure section by three lines, containing an evaporator, an absorber, and a solution pump.

The invention also relates to a method of operating an absorption refrigeration system with separate high- and low-pressure sections that are connected by lines and with an evaporator for subcooling the liquified regrigerant before it enters a connecting line.

Absorption refrigeration systems of this type are known (*Klima- und Kalteingenieur, Extra* 14, Karlsruhe, C. F. Müller, pub., 1981, 66–68). They have been proven practical when waste heat is exploited to heat the system. Separating the high- and low-pressure sections makes it possible to design a high-pressure section with less heat loss in the vicinity of the source of heat, whereas it is best to associate the low-pressure section with the refrigeration load. Shorter suction lines will then lead to low pressure losses. The two sections are connected by only three uninsulated lines, one for the strong refrigerant solution, one for the weak refrigerant solution, and one for the refrigerant fluid. The sections can be separated by at least 800 m.

Whereas the weak refrigerant solution is generally highly subcooled in relation to saturation pressure, the liquified refrigerant is only slightly subcooled downstream of the condenser. When the lines are long and the ambient temperature high and when there are height differences inside the line channeling, the refrigerant can start to boil, forming bubbles of gas that disrupt fluid transport.

This problem can be counteracted by additional subcooling downstream of the condenser. Subcooling with cooling water, however, is possible only to a limited extend and, indeed, practically impossible when evaporation condensers are employed. Subcooling must accordingly occur in a subcooling condenser by means of a refrigerant that boils under low pressure. An outside refrigeration cycle with a compression refrigeration unit can be employed. This means, however, that an additional mechanical component must be introduced into the system, eliminating an essential advantage of absorption refrigeration systems, specifically the low number of moving parts.

It would be more practical to exploit refrigerant from the system for this cooling. The refrigerant vapor must, however, then be conveyed to the low-pressure side for absorption in the system absorber. This necessitates an additional line from the high-pressure to the low-pressure side, and the line must be insulated to prevent sweating.

SUMMARY OF THE INVENTION

The object of the present invention is to provide a system and method of the aforesaid type that will enable uninterrupted transport of the weak refrigerant solution without increasing prime cost.

This object is attained in an absorption refrigeration system in accordance with the invention in that expanded and evaporating refrigerant fluid flows through the subcooler, in that the condenser in the high-pressure section is in a line that conveys the weak refrigerant solution, and in that the exit from the subcooler communicates through another line downstream of an expansion valve with the line that conveys the weak refrigerant solution in such a way that the connecting line that conveys the weak refrigerant solution acts as an uncooled absorber.

The object is furthermore attained in a method in accordance with the invention in that the refrigerant vapor is fed from a subcooler into the expanded weak refrigerant solution at one or more points and in that a connecting line that conveys the weak refrigerant acts as an absorber.

The weak refrigerant solution is expanded in accordance with the invention in the high-pressure section and the refrigerant vapor is directly fed in an appropriate way into the expanded weak refrigerant solution at one or more points and absorbed by the solution. The high ratio of the mass flow of the solution to that of the refrigerant eliminates the need for cooling, and the connecting line that conveys the weak refrigerant solution acts as an uncooled absorber.

Positioning the expansion valve in the high-pressure section entails the further advantage of eliminating the necessity for long instrument lines for this control circuit between the two sections of the system. The weak refrigerant solution is generally so subcooled when it leaves the solution heat exchanger that it will remain sufficiently subcooled even subsequent to expansion to prevent the formation of bubbles of vapor in the connecting line. Furthermore, the relatively high flow of solution and the resultingly beneficial ratio between output cross-section and surface makes the effect of heat irradiation less powerful than in the line that conveys the liquid refrigerant.

Another expansion valve can be associated with the line in the low-pressure section that conveys the weak refrigerant solution.

Thus, in special cases involving extremely long connecting lines, high ambient temperatures, and height differences, the weak refrigerant solution is expanded in two stages, with one expansion valve in the high-pressure section and another in the low-pressure section. This makes it possible to adjust the pressure in the connecting line to where it will be both low enough to ensure a low enough evaporating point in the subcooler and high enough to reliably maintain the weak refrigerant solution in the subcooled state. Before entering the second expansion valve, the weak refrigerant solution can be cooled with water if necessary to prevent it from starting to boil as it enters the absorber even after the second expansion.

The second expansion valve can be either an unvariable constriction or automatically controlled.

A preferred embodiment of the invention will hereinafter be described with reference to the appended drawing. It is to be understood, however, that this is merely by way of example and that the scope of the protection sought for the invention is defined exclusively in the claims.

BRIEF DESCRIPTION OF THE DRAWING

The FIGURE is a schematic view of an absorption refrigeration system in accordance with the invention.

DESCRIPTION OF THE PREFERRED EMBODIMENTS

The absorption refrigeration system consists of a low-pressure section 1 and of a high-pressure section 2 that are separated by as much as 800 m or more. Low-pressure section 1 contains an evaporator 3, an absorber 4, and a solution pump 5. The major components of high-pressure section 2 are a desorber 6, a rectifying column 7, a condenser 8, a solution heat exchanger 9, and a subcooler 10 downstream of condenser 8. Low-pressure section 1 and high-pressure section 2 are connected by lines 13, 14, and 15. Cold strong refrigerant solution is conveyed through line 13, weak refrigerant solution through line 14, and refrigerant fluid through line 15.

There is an initial expansion valve 11 in the line 18 that conveys the weak refrigerant solution. If two-stage expansion is necessary, another expansion valve 16 can be positioned in the line 19 in low-pressure section 1 that conveys the weak refrigerant solution upstream of where it enters absorber 4. Second expansion valve 16 can be either an unvariable constriction or automatically controlled. A solution cooler 17 can be positioned in line 19 upstream of absorber 4 and of second expansion valve 16.

An evaporating partial flow of refrigerant fluid travels through subcooler 10. The refrigerant vapor-end exit 20 from subcooler 10 communicates with the line 18 that conveys the weak refrigerant solution through one or more feed points 12. Feed point or points 12 are downstream of initial expansion valve 11.

Refrigerant is evaporated by low-pressure heat abstraction in evaporator 3 and absorbed in absorber 4. The refrigerant solution is accordingly enriched with refrigerant, brought to the condensation pressure of high-pressure section 2 by means of solution pump 5, and conveyed into the desorption section with its desorber 6 and rectifying column 7 through connecting line 13 and solution heat exchanger 9, which provides for internal heat exchange. The supply of heat to desorber 6 expels refrigerant. The resultingly regenerated weak refrigerant solution is cooled in solution heat exchanger 9, and expanded to to the evaporation pressure of low-pressure section 1 in initial expansion valve 11. The weak refrigerant solution is fed back to absorber 4, directly in the case of single-stage expansion, through connecting line 14. When the weak refrigerant solution is expanded in two stages, the second stage occurs in second expansion valve 16, subsequent if necessary to additional cooling in solution cooler 17.

The refrigerant vapor expelled in desorber 6 is clarified in rectifying column 7 and then liquified in condenser 8. The refrigerant is subcooled in subcooler 10 by evaporating a partial flow before it enters connecting line 15. The refrigerant fluid is then expanded again in evaporator 3. The refrigerant vapor that forms in subcooler 10 is introduced into the expanded weak refrigerant solution at feed point 12 and absorbed inside line 14. Connecting line 14 accordingly functions as an uncooled absorber. What is called the solution residue, a partial flow that has to be bled from evaporator 3 to prevent impermissibly high enrichment there, is also returned to connecting line 14, with subcooler 10 maintained at a somewhat higher pressure.

The invention has been described herein with reference to an exemplary embodiment. It will be understood, however, that it is receptable of various modifications, which will offer themselves to those skilled in the art and which are intended to be encompassed within the protection sought for the invention as set forth in the appended claims.

I claim:

1. An absorption refrigeration system, comprising: a separate high-pressure section and a separate low-pressure section; said high-pressure section having a desorber, a rectifying column, a solution heat exchanger, a condenser, and a subcooler-evaporator; said low-pressure section being connected to said high-pressure section by three lines; said low-pressure section having an evaporator, an absorber, and a solution pump; a connecting line for conducting liquified refrigerant; said subcooler-evaporator located in said high-pressure section being connected between said condenser and said connecting line for conducting liquified refrigerant; said subcooler-evaporator subcooling said liquified refrigerant before entering said connecting line for conducting liquified refrigerant; an expansion valve in an outlet line of said solution heat exchanger; vapor exit means from said subcooler-evaporator communicating with an outlet line of said expansion valve at a junction, said outlet line of said expansion valve conveying weak refrigerant solution; a connecting line leaving from said junction and functioning as an uncooled absorber in conveying said weak refrigerant solution; a further expansion valve in a line in said low-pressure section and conveying weak refrigerant solution.

2. Absorption refrigeration system as defined in claim 1, wherein said further expansion valve has a fixed throttle position.

3. Absorption refrigeration system as defined in claim 1, wherein said further expansion valve is automatically controlled.

4. Absorption refrigeration system for using waste heat in a predetermined efficient manner to heat the absorption refrigeration system, comprising: a separate high-pressure section and a separate low-pressure section at separate locations; said high-pressure section having a desorber, a rectifying column, a solution heat exchanger, a condenser, and a subcooler-evaporator; said low-pressure section being connecting to said high-pressure section by three lines; said low-pressure section having an evaporator, an absorber, and a solution pump; a connecting line for conducting liquified refrigerant; said subcooler-evaporator located in said high-pressure section being connected between said condenser and said connecting line for conducting liquified refrigerant; said subcooler-evaporator subcooling said liquified refrigerant before entering said connecting line for conducting liquified refrigerant; an expansion valve in an outlet line of said solution heat exchanger; vapor exit means from said subcooler-evaporator communicating with an outlet line of said expansion valve at a junction, said outlet line of said expansion valve conveying weak refrigerant solution, said subcooler-evaporator feeding refrigerant vapor from said vapor exit means into an expanded weak refrigerant solution; a connecting line leading from said junction and functioning as an uncooled absorber in conveying said weak refrigerant solution.

5. Absorption refrigeration system for using waste heat in a predetermined efficient manner to heat the absorption refrigeration system, comprising: a separate high-pressure section and a separate low-pressure section at separate locations said high-pressure section having a desorber, a rectifying column a solution heat exchanger, a condenser, and a subcooler-evaporator; said low-pressure section being connected to said high-pressure section by three lines; said low-pressure section having an evaporator, an absorber, and a solution pump; a connecting line for conducting liquified refrigerant; said subcooler-evaporated located in said high-pressure section being connected between said condenser and said connecting line for conducting liquified refrigerant; said subcooler-evaporator subcooling said liquified refrigerant before entering said connecting line for conducting liquified refrigerant; an expansion valve in an outlet line of said solution heat exchanger vapor exit means from said subcooler-evaporator communicating with an outlet line of said expansion valve at a junction, said outlet line of said expansion valve conveying weak refrigerant solution, said subcooler-evaporator feeding refrigerant vapor from said vapor exit means into an expanded weak refrigerant solution at at least one point; a connecting line leading from said junction and functioning as an uncooled absorber in conveying said weak refrigerant solution.

6. An absorption refrigeration system, comprising: a separate high-pressure section and a separate low-pressure section; said high-pressure section having a desorber, a rectifying column, a solution heat exchanger, a condenser, and a subcooler-evaporate; said low-pressure section being connected to said high-pressure section by three lines; said low-pressure section having an evaporator, an absorber, and a solution pump; a connecting line for conducting liquified refrigerant; said subcooler-evaporator located in said high-pressure section being connected between said condenser and said connecting line for conducting liquified refrigerant; said subcooler-evaporator subcooling said liquified refrigerant before entering said connecting line for conducting liquified refrigerant; an expansion valve in an outlet line of said solution heat exchanger; vapor exit means from said subcooler-evaporator communicating with an outlet line of said expansion valve at a junction, said outlet line of said expansion valve conveying weak refrigerant solution; said subcooler-evaporator feeding refrigerant vapor from said vapor exit means into an expanded weak refrigerant solution at at least one point; a connecting line leaving from said junction and functioning as an uncooled absorber in conveying said weak refrigerant solution; a further expansion valve in a line in said low-pressure section and conveying weak refrigerant solution.

* * * * *